Aug. 8, 1933.　　　　H. D. STECHER　　　　1,921,709
PIPE COUPLING
Filed Feb. 5, 1932
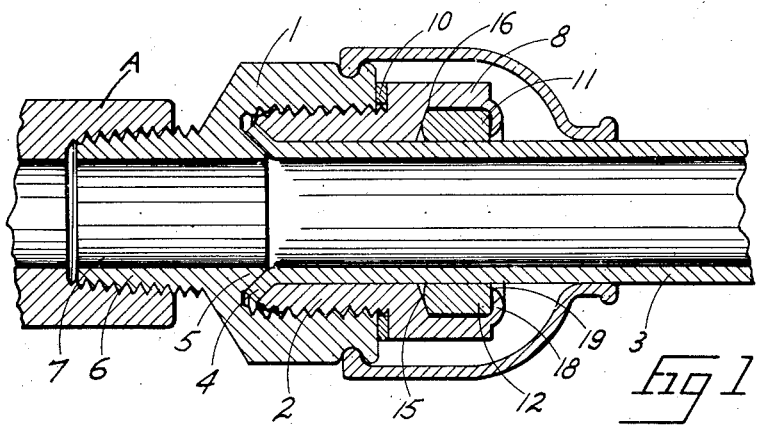
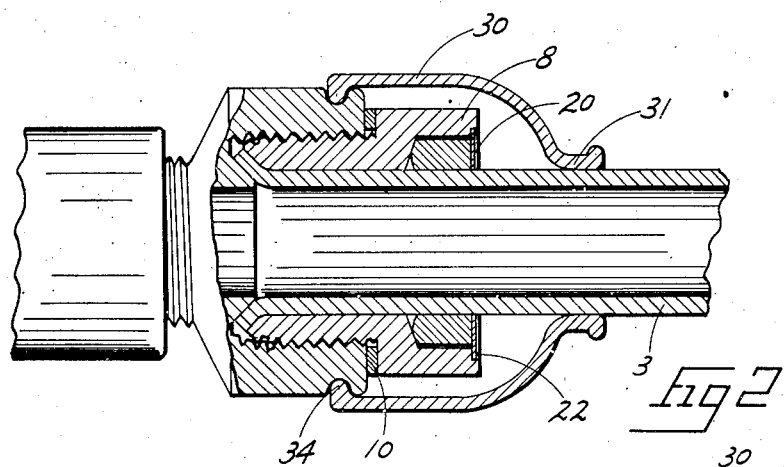
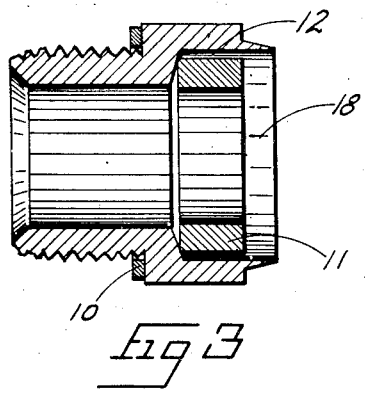
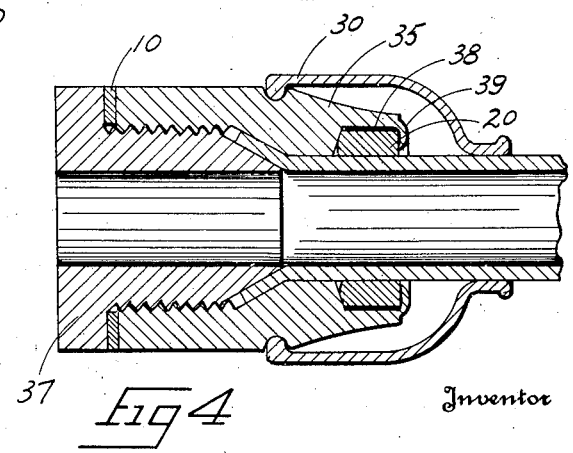
Inventor
HENRY D. STECHER,
By Richey & Watts
Attorney Patented Aug. 8, 1933

1,921,709

UNITED STATES PATENT OFFICE 1,921,709

PIPE COUPLING

Henry D. Stecher, Cleveland, Ohio, assignor to The Weatherhead Company, Cleveland, Ohio, a Corporation of Ohio Application February 5, 1932. Serial No. 591,100

8 Claims. (Cl. 285—86)

This invention relates to pipe couplings. It has to do with a multi-part pipe coupling such as that disclosed in United States Patent No. 1,733,925, to Albert J. Weatherhead Jr. bearing the date of October 20, 1929, and contemplates certain improvements therein relating to the insulating of the component elements, one with respect to the other, and with respect to the tubing, and the shielding or protecting of the coupling as a whole from outside influences. However, it is to be understood that I employ the coupling of the aforesaid patent merely as a vehicle for conveying the teachings of the instant invention and these improvements may well apply to couplings of other design, such as, for instance, an S. A. E. fitting.

Coupling devices, such as that disclosed in this application are susceptible of inclusion in all manner of fluid transmitting lines, more so, however, lines of small bore such as automobile fuel lines or, particularly, refrigerator lines for conveying condensate and/or liquid to and from the chilling unit, pump, tank, etc. In electrical refrigerating systems, multi-part couplings are disposed, as a general rule, in the condensate line on the pump side of the chilling unit and adjacent thereto, and the periodic conditions of low temperature that exist in the line induces moisture to collect on the outside of the pipe as well as the coupling device. This moisture seeks out the joints and crevices of the coupling that are exposed and when the temperature in the line is reduced to a point below freezing, the products of condensation lying in the niches and cracks solidifies. In some instances, no damage results whereas on the other hand the parts of the coupling may be burst apart or collapsed, depending of course on the capacity of the niche or crack, degree of expansion of the liquid upon solidification, and the strength of the metal to resist such expansion.

One object of this invention is to provide a multi-part coupling wherein the elements are insulated, one with respect to the other. Another object is to provide a shielded coupling that is adapted for installation where the range of temperature is so wide as to make the use of an unshielded coupling out of the question. A particular object is to provide a seal between the male and female parts of the coupling as well as between the male part of the coupling and the coupling tube. A specific object is to shield the coupling as an entity by the provision of an external cover overlying all the joints.

Other objects and advantageous features of this invention will be noted in the accompanying detailed description and drawing, wherein like characters of reference designate like parts and wherein:—

Figure 1 is a vertical longitudinal section of my improved coupling;

Fig. 2 is a view similar to that of Fig. 1, disclosing a slightly modified coupling;

Fig. 3 is a detail in section of the male member and the seals therefor;

Fig. 4 is a vertical longitudinal section through an S. A. E. fitting showing my improvements incorporated therein.

With reference to the drawing, I have shown therein a coupling device that corresponds to the coupling disclosed in the Weatherhead patent supra. This coupling consists generally of two parts, namely a male and a female part, adapted to be screwed together to grip one end of a coupling tube therebetween to provide a secure leak-proof joint. It is my intention to insulate the male part with respect to the female part as well as the coupling tube and to enclose the assembled coupling, at least the major portion thereof in a protecting housing.

Referring again to the coupling, I have shown the same, in Figs. 1 and 2, as comprising a chambered body 1 and a hollow tubular nut 2 sleeved on a coupling pipe 3 having a flared end 4 that, when the parts are united, is compressed against a conical seat 5 in the bottom of the chamber. Connection with a lead A is through the threaded extension 6 formed as a part of the body, the tube 3 constituting the other lead, communication being established between the leads by way of an axial bore 7 in the extension. So much for the coupling per se, which has been dealt with in detail in the prior Weatherhead patent and will not be discussed in detail hereinafter only insofar as necessary to a clear understanding of my improvements thereto.

I have mentioned hereinbefore that I intend to provide a seal between the nut and the body, the nut and the coupling tube, and to provide an overall shield for the whole assembly. I will take up these improvements in order, beginning with the seal between the nut and body.

It will be noted in Figs 1 and 2 that there is a clearance between the head of the tubular nut 2, designated by the numeral 8, and the radial end face of the female part of the coupling. The degree of clearance, of course, depends on how far the nut is screwed into the female part of the coupling, however, this zone is one wherein moisture collects and I have provided means for "filling the gap" in the form of a rubber, or rubber composition, washer 10, that surrounds the outside of the nut 2 and lies between the opposing surfaces of the head and female part. This seal will effectively preclude water from lying between the two surfaces and will enhance the value of the coupling for its intended use.

The second seal which I intend to provide comes between the nut and the tube 3 and lies at the end of the axial bore in the nut. Heretofore, moisture would collect on the tube and enter between the wall of the bore in the nut and the outer periphery of the tube. On freezing, the tube would give, being of softer metal, and after several periodic changes in temperature, the walls would collapse upon themselves.

To provide a space for the seal, designated by the numeral 11, which is sleeved on the pipe 3 and is somewhat thicker than the other seal altho of the same material, I have produced a cavity 12 in the head of the nut concentric with the bore. The diameter of this cavity is slightly greater than the outside diameter of the sealing disc so that the disc may expand circumferentially when the tube is forced therethrough, the inside diameter of the bore in the disc being slightly less than the diameter of the tube, it being well known that rubber is relatively incompressible and it would be practically impossible to force the tube through the hole if the seal fit snugly in its niche. Axial expansion of the disc is provided for, at least in the zone adjacent the central opening, by making the bottom 15 of the cavity conical.

The seal between the disc and the head is taken along a circumferential line on the rear radial face of the disc near the periphery, as at 16, and the bottom of the cavity. A seal is effected between the opposite face and the marginal edge of a lip 18, as at 19, that serves also as a retainer for the disc and is spun down after the disc has been positioned. The lip is shown in Fig. 3 before being spun down.

Fig. 2 discloses a slight modification over Fig. 1 in that a metal retaining washer 20, is employed to hold the disc in position that takes the place of the lip 18 and necessitates only the spinning down of the edge 22 of the wall defining the cavity to hold it in place. The seal, of course, is taken between the disc and washer.

It will be appreciated that thus far, I have produced a multi-part coupling device that is well insulated at two zones that heretofore were unprotected against moisture.

The third feature of this invention is to provide a protecting sheath or covering for the coupling device that encompasses the major portion of the coupling and overlies the two zones of insulation. This sheath takes the form of a hollow nipple 30, open at both ends, of rubber or rubber composition that is provided with a small neck 31 that snugly embraces the pipe 3. The opposite large end of the nipple has an inturned flange 34 that drops into a circumferential depression on the outside of the coupling body 1, the connection affording a means for retaining the nipple in position as well as setting up a seal between the parts.

With the coupling thus insulated and protected, it will be quite apparent that it may be employed in places where moisture is prevalent, particularly where the temperature range is such that the moisture condenses and freezes. The first barrier to overcome is the shield 30 which not only will exclude moisture laden air but will prevent drippings from surrounding surfaces from splashing directly on the coupling. Another feature consists in the fact that the coupling may be used in an upright position, a point that has not been touched on heretofore, without damage of water collecting on the head of the nut and running down the tube.

The embodiment of the invention shown in Fig. 4 illustrates an S. A. E. fitting, the numeral 35 indicating the female member and the numeral 37 designating the male member. The end of the female member may be tapped to provide a cavity, as at 38, for the sealing member 20, after which a lip 39, identical with the lip 18, may be spun over to hold the same in place. The washer 10 is placed between the head of the male member and the end wall of the female member and lastly the nipple 30 may be employed to enclose the parts in a manner similar to that shown in Fig. 1.

Altho I have shown and described a preferred embodiment of my invention, as well as one modification, it will be apparent to those skilled in the art that various modifications and alterations are possible without departing from the spirit and scope of this invention and that the improvements thus advanced may be applied to coupling of other design, hence, I do not care to be limited to the exact disclosure made, other than by the scope of the appended claims.

Having thus described my invention, what I claim is:—

1. A coupling device comprising a female member and a male member adapted to be screwed together, said members having cooperating conical seats adapted to clamp and seal a flared end of a pipe therebetween, one of said members having a ring of resilient sealing material disposed adjacent one end thereof and spaced apart from said conical seats, said resilient ring being adapted to engage said pipe and to prevent the entrance of moisture between said pipe and said member.

2. A coupling device comprising a female member and a male member adapted to be screwed together, said members having cooperating conical seats adapted to clamp and seal a flared end of a pipe therebetween, one of said members being provided with resilient sealing means seated in the body of the member and adapted to engage the exterior of the pipe in a zone spaced away from the flared end thereof.

3. A coupling device comprising a female member and a male member adapted to be screwed together, said members having cooperating conical seats adapted to clamp and seal a flared end of a pipe therebetween, one of said members having a ring of resilient sealing material seated in the body thereof, said resilient ring being adapted to engage the exterior of said pipe in a zone spaced apart from the flared end thereof, said resilient ring being compressed and retained in position by a flange on said member.

4. In a pipe coupling, the combination of a female member having a fluid passage and a screw threaded chamber, an externally threaded male member adapted to be screwed into said female member, and having a passage adapted to receive a coupling pipe having a flared end, said male and female members having cooperating conical seats adapted to clamp and seal the flared end of said pipe, and said male member having a ring resilient sealing material seated in the head thereof, said resilient ring being adapted to engage said pipe in a zone spaced apart from the flared end thereof and to prevent the entrance of moisture between said pipe and said member.

5. The combination with a coupling device comprising an internally threaded female member and an externally threaded male member, said members having cooperating conical seats adapted to clamp and seal a flared end of a pipe therebetween, said members also having oppositely disposed adjacent exterior surfaces, of means of sealing the space between said surfaces comprising a sealing washer disposed between said surfaces, said washer being adapted to be compressed when the respective members are screwed together to clamp the flared end of the pipe.

6. A coupling device comprising a female member and a male member adapted to be screwed together, said members having cooperating conical seats adapted to clamp and seal a flared end of a pipe therebetween, one of said members having a cavity in the head thereof, a resilient sealing ring disposed within said cavity, said sealing ring normally having an internal diameter slightly less than the external diameter of the pipe, whereby the ring is forced into sealing engagement with at least one surface of the cavity when the pipe is inserted within the member, said ring being adapted to engage the pipe in a zone spaced away from the flared end thereof.

7. A coupling device comprising a female member and a male member adapted to be screwed together, said members having cooperating conical seats adapted to clamp and seal a flared end of a pipe therebetween, one of said members having a cavity in the body portion thereof, a ring of resilient material seated in said cavity and adapted to engage the pipe in a zone spaced away from the flared end thereof, said ring normally having an internal diameter slightly less than the external diameter of the pipe and said cavity being slightly larger than said ring in at least one dimension, whereby the ring may be expanded within the cavity upon insertion of the pipe.

8. A coupling device comprising a female member and a male member adapted to be screwed together, said members having cooperating conical seats adapted to clamp and seal a flared end of a pipe therebetween, one of said members having a cavity in the body portion thereof, a ring of resilient material seated in said cavity and adapted to engage the pipe in a zone spaced away from the flared end thereof, said ring normally having an internal diameter slightly less than the external diameter of the pipe, and a wall of said cavity axially adjacent the ring being cut away in a zone adjacent the pipe whereby the ring may be expanded within the cavity upon insertion of the pipe.

HENRY D. STECHER.